May 20, 1958 A. J. FLYE, SR 2,835,069
FISHING LEADERS
Filed Aug. 8, 1955
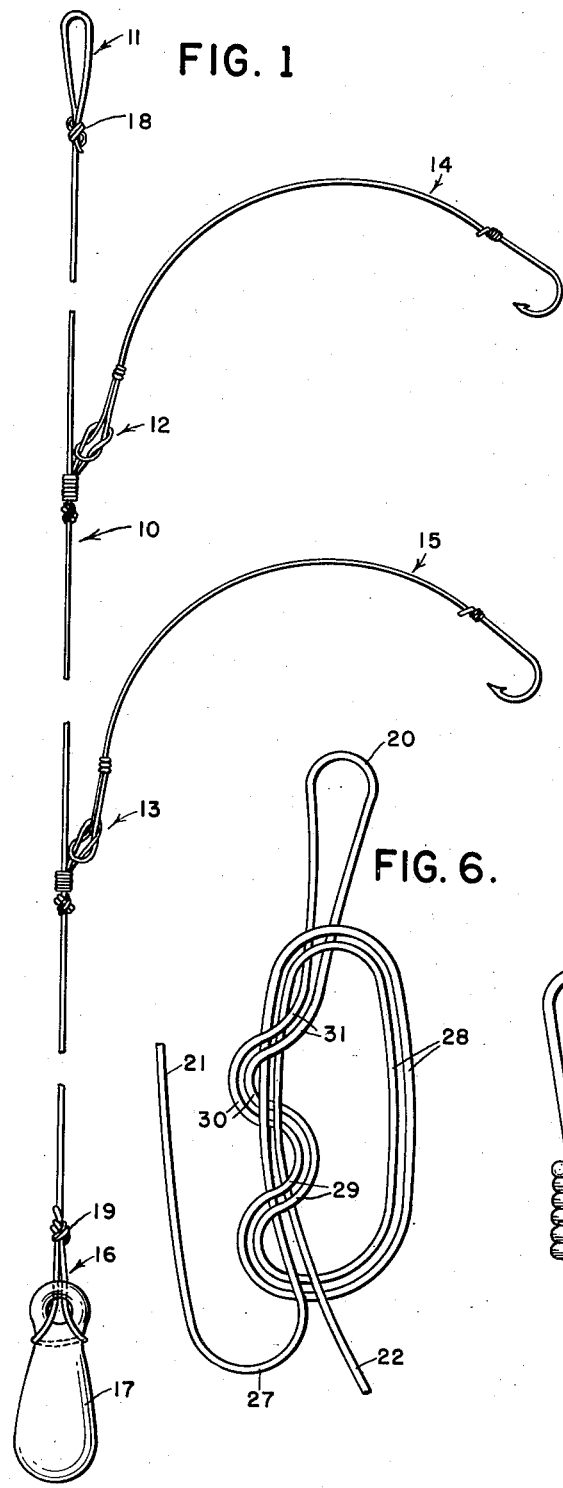
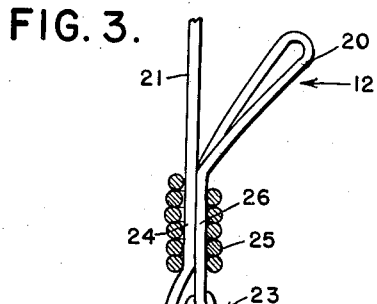
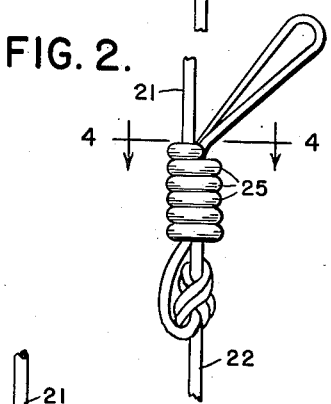
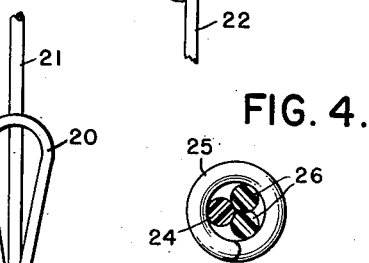
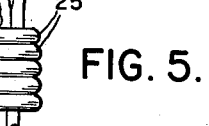
INVENTOR.
Arthur J. Flye Sr.
BY Shoemaker & Mattare
ATTORNEYS

United States Patent Office 2,835,069
Patented May 20, 1958

2,835,069
FISHING LEADERS
Arthur J. Flye, Sr., Washington, D. C.

Application August 8, 1955, Serial No. 526,803

2 Claims. (Cl. 43—44.84)

This invention relates to fishermen's accessories and pertains more particularly to an improved construction of leader.

An important object of this invention is to provide an improved leader construction wherein the leader is formed from a single strand or length of suitable material such as plastic or the like.

Another object of this invention is to provide an improved leader construction wherein the means for attaching the snell hook assemblies thereto are so constructed as to cause the snell hook assemblies to assume a position relative to the main body portion of the leader that will materially enhance the probability of catching a fish.

Another object of this invention is to provide an improved leader construction wherein the means for attaching snell hook assemblies thereto takes the form of integral loops whereby no knotting is required in attaching the snell assemblies thereto.

A further object of this invention resides in the construction of an improved leader assembly wherein snell hook fastening means is formed by looping and tying an intermediate portion of the leader and subsequently binding the resultant loop to the body of the leader in such a manner that the loop projects upwardly along the main body of the leader so that when a snell hook assembly is subsequently attached thereto, the same will, when in the water, assume a position which will be enticing to fish and which will tend to obviate any tangling of the snell hook assembly with the leader or the line.

In the drawings:

Fig. 1 is a view showing a leader constructed in accordance with this invention;

Fig. 2 is an enlarged view showing one of the snell hook fastening means;

Fig. 3 is a sectional view taken through the assembly shown in Fig. 2;

Fig. 4 is an enlarged horizontal section taken substantially along the plane of section line 4—4 in Fig. 2;

Fig. 5 is another view of the snell hook fastening means similar to Fig. 2 but taken in a different plane; and Fig. 6 is a view showing the manner in which the leader assembly is knotted to provide one of the snell hook assemblies fastening loops.

Referring now more particularly to Fig. 1, the reference numeral 10 designates generally the integrally formed leader assembly which will be seen to be comprised of an upper loop 11 for convenience in attaching the same to a fishing line, intermediate snell hook fastening loop assemblies 12 and 13 whereby the snell hook assemblies 14 and 15 can be readily attached to the leader and the lower loop assembly 16 by means of which the sinker member 17 may be readily attached and detached from the leader.

The upper loop 11 is formed by doubling over a predetermined length of the integral leader assembly and knotting the same as indicated by the reference character 18. This knot 18 may be of any desired form but it is preferred to be of the type which will prevent slippage of the material from which the leader is formed and in this respect it is preferred that the leader be formed of some suitable material such as gut, plastic or the like.

The lower loop assembly 16 is formed similarly to the upper loop 11, the knot forming the same being indicated by the reference character 19.

The particular formation of the intermediate loop assemblies 12 and 13 is of particular significance in so far as their formation materially enhances the success of the leader assembly in the performance of its duties.

Reference is had now more particularly to Figs. 2–5 wherein one of the snell hook fastening loops is shown in detail. It will be noted that the loop proper 20 is so formed as to extend upwardly generally adjacent the upper portion 21 of the strand from which the leader assembly is formed, the lower portion thereof being indicated by the reference character 22. The upper portion 21 and lower portion 22 are joined by the knot 23, and immediately above the knot the loop 20 is bound to the part 24 of the upper portion by means of the coils 25 which are wrapped therearound, see particularly Fig. 3. Thus, considerable portions 26 of the loop immediately above the knot 23 are held in close contact with the part 24 of the upper portion of the leader assembly leaving a free loop portion of predetermined length above the wrapping coils 25. The wrapping material is preferably a soft metal such as copper or the like and the number of coils is dependent upon the quantity of free loop desired to be left above the same. In this respect, it is desired that only sufficient free loop be left as to permit ready engagement of one of the snell hook assemblies 14 or 15 therewith since the shorter the loop will be, the more tendency the free loop will have to dispose the snell hook assemblies in arched fashion as illustrated in Fig. 1 even when bait is attached thereto. It is desired that the snell hook assemblies arch away from the leader so as to prevent entanglement therewith and also to present the bait at a point far remote from the bulk of the leader so that the fish will more readily take such bait. In actual practice, a baited hook in the water will hang at about the same level or slightly below the knot 23.

The wrapping material forming the coils 25 firmly embraces the various leader portions 24 and 26 to prevent axial movement of such coils but the coils are not wrapped around and clamped into place with such force as would tend to mar or damage any portion of the leader or to distort the cross-sectional area thereof, see particularly Fig. 4.

The manner in which the knot 23 is preferably formed is shown most particularly in Fig. 6. In actual construction of the leader assembly, the upper loop 11 is first formed and engaged upon a suitable peg or pin so that the remainder of the leader may be manipulated with one hand to tighten or slacken the same. When the loop 11 is engaged on such a peg or pin, a predetermined distance is marked off from the loop to the point 27 at which the knot is begun. At this point, the remainder of the leader is doubled over to form a loop 20, a predetermined length of the leader being doubled over to effect this result. With the leader thus held manually, the looped portion is first tied loosely into a simple overhand knot as is illustrated by the loop 28 formed in Fig. 6 and the first pass 29 engaged over and under such loop to emerge in the portion 30. The knot is then completed by passing the remaining portion 31 over and then under the loop 28 to emerge as the loop portion 20 and the entire knot is then drawn tight by manually pulling on the lower end portion 22 of the leader which, of course, will tighten the upper portion 21 which is attached to the peg by the loop 11. If the distance to the point 27 and the amount of the leader which is doubled over to form the loop 20 is of a predetermined magnitude, the resultant loop 20 will be placed a predetermined distance from the loop 11 and the extent of free loop before the wrapping 25 is applied will also be of a predetermined magnitude. Although the knot 23 could be formed as a simple overhand knot, to prevent slippage thereof, it is developed as previously described and as shown in Fig. 6. After the knot is pulled tight, the wrapping material 25 is applied so that the free loop 20 projects upwardly toward the upper loop 11 so as to dispose the snell hook assemblies 14 and 15 in proper relation when the same are baited and the device is in the water. If the previously mentioned distances are closely adhered to and of a predetermined magnitude, approximately the same number of wrappings or coils 25 will be required to produce the desired length of free loop 20.

Of course, an associated fishing line and the sinker member 17 may be secured to the leader assembly 10 in any manner at the discretion of the user. However, it will be noted that the leader is provided with the loops 11 and 16 for the express purpose of permitting both the associated fishing line and the sinker to be readily attached thereto without necessitating the tying of any knots whatsoever. This is extremely helpful to the fisherman and permits the fishing gear to be assembled in the quickest and easiest manner. This is especially important also in regard to disconnecting the leader from the fishing line and the sinker from the leader after the same have been used in the water, it being well known that when the leader and fish line become water soaked, any manipulation requiring the untying of knots becomes extremely difficult and is time-consuming.

To facilitate the securement of the leader to a fishing line, the end of the fishing line is looped in the same manner as are the snell hook assemblies 14 and 15, and the loop on the fishing line is engaged with the loop 11 of the leader in the same manner as is shown for looping the snell hook assemblies to their associated leader loops 12 and 13.

Of course, an associated snell hook may be tied, if desired, to one of the leader loops 12 or 13 but it is desired that the specific manner of attachment shown be utilized since the interlocking action of the leader loop with the snell assembly loop tends to project the line portion of the snell hook in coaxial relation with the leader loop so that the snell hook assemblies will arch over in the manner shown in Fig. 1 whereby when baited, they will form a very enticing arrangement and one which will not easily become ensnared or hooked with any portion of the leader.

It may also be pointed out that it is desired that the extent of the leader between adjacent snell hook loops such as those shown at 12 and 13 be greater than the normal length for conventional snell hook assemblies since this positively prevents either one of the snell hooks becoming entangled with the other.

Also, it is desirable so to form the snell hook assembly loops 12 and 13 such that they are disposed at opposite sides of the line whereby the snell hooks will project outwardly from the leader on opposite sides thereof and not on the same side, as is illustrated in Fig. 1. This further obviates the possibility of entanglement between the two snell hook assemblies.

As can be seen most clearly in Fig. 6, in making one of the loops 12 or 13 for attaching a snelled hook thereto, an intermediate portion of the length of material 10 is doubled upon itself to form a U-bend having its terminus in the loop 20 and having sides encompassing the portions 29, 30 and 31 extending from the oppositely directed end portions 21 and 22 of the length of material and the U portion is then bent backward upon itself and around the sides and inserted through the loop formed by its backward turn and thereafter pulled up tight to form the knot and leaving the loop 20 isolated from the end portions 21 and 22. Thereafter, as is shown most clearly in Fig. 5, the base of this loop portion is wrapped by the material 25 tightly against the upwardly extending end portion 25 of the material to reduce the size of the loop and to cause it to be directed upwardly along the line, for the purposes as hereinbefore set forth.

I claim:

1. The method of making a fishing leader which comprises cutting a predetermined length of flexible cord-like material, doubling an intermediate portion of the material upon itself to form a U-bend portion and sides extending from oppositely directed end portion of the material, bending said U-portion backward and around said sides, inserting the U-bend through the loop formed by its backward turn, pulling said U-bend up tightly to make a knot, bending said U-bend portion so as to cause the same to lie along one of said end portions and in a direction extending away from the knot, binding the sides intermediate the U-bend and the knot to said one end portion to an extent to leave only a reduced loop free of the binding material and remote from the knot, and forming the opposite ends of said flexible material into loops for attachment to a fishing line and a sinker.

2. In a fishing leader comprising a length of flexible cord-like material having one end portion adapted for connection to a fishing line and its opposite end portion for connection to a sinker, an intermediate portion doubled upon itself to form a U-bend and sides extending from oppositely directed end portions of the material and the U-bend being bent backward around said sides and inserted through the loop formed by its backward turn to provide a knot at the base of the U-bend in the doubled portion thereof whereby the knot contains doubled portions of said U-bend throughout and leaves only a reduced loop beyond said knot, said reduced loop being formed to lie along said one end portion in a direction extending away from said knot and in close adjacency to said material, a length of wire tightly wound about the base of said reduced loop and the adjacent length of said one end portion immediately adjacent said knot to bind the base of said reduced loop to said one end portion and leave an end of the loop free and projecting along said material toward one end thereof for attachment of a snelled hook thereto.

References Cited in the file of this patent

UNITED STATES PATENTS

| | | |
|---|---|---|
| 118,772 | Camp | Sept. 8, 1871 |
| 790,336 | Yoerger | May 23, 1905 |
| 1,501,953 | Leslie | July 22, 1924 |
| 2,170,788 | Augenblick | Aug. 22, 1939 |
| 2,225,135 | Skoverski | Dec. 17, 1940 |